United States Patent
Anand et al.

(10) Patent No.: US 9,823,993 B2
(45) Date of Patent: Nov. 21, 2017

(54) PREEMPTIVE TROUBLE SHOOTING USING DIALOG MANAGER

(71) Applicant: International Business Machines Corporation, Armonk, NY (US)

(72) Inventors: Rangachari Anand, Teaneck, NJ (US); Juhnyoung Lee, Yorktown Heights, NY (US); Feng Li, Beijing (CN); Qi C. Li, Beijing (CN); Shao C. Li, Beijing (CN); Lijun Mei, Beijing (CN)

(73) Assignee: International Business Machines Corporation, Armonk, NY (US)

(*) Notice: Subject to any disclaimer, the term of this patent is extended or adjusted under 35 U.S.C. 154(b) by 176 days.

(21) Appl. No.: 14/748,724

(22) Filed: Jun. 24, 2015

(65) Prior Publication Data
US 2016/0259709 A1 Sep. 8, 2016

Related U.S. Application Data

(63) Continuation of application No. 14/637,500, filed on Mar. 4, 2015.

(51) Int. Cl.
| | |
|---|---|
| G06F 3/00 | (2006.01) |
| G06F 11/36 | (2006.01) |
| G06F 3/0484 | (2013.01) |
| G06F 3/0481 | (2013.01) |
| G06F 17/30 | (2006.01) |
| G06F 11/34 | (2006.01) |

(Continued)

(52) U.S. Cl.
CPC ........ *G06F 11/3612* (2013.01); *G06F 3/0481* (2013.01); *G06F 3/0484* (2013.01); *G06F 11/3003* (2013.01); *G06F 11/3093* (2013.01); *G06F 11/3466* (2013.01); *G06F 17/30424* (2013.01); *G06F 17/30528* (2013.01); *G06F 17/30554* (2013.01); *G06F 2201/865* (2013.01)

(58) Field of Classification Search
None
See application file for complete search history.

(56) References Cited

U.S. PATENT DOCUMENTS

| | | |
|---|---|---|
| 6,484,155 B1 | 11/2002 | Kiss et al. |
| 6,823,497 B2 | 11/2004 | Schubert et al. |

(Continued)

OTHER PUBLICATIONS

IT Service Management Forum—USA. http://www.itsmfusa.org/, 1 page.

(Continued)

*Primary Examiner* — Toan Vu
(74) *Attorney, Agent, or Firm* — Scully, Scott, Murphy & Presser, P.C.; Louis J. Percello, Esq.

(57) ABSTRACT

One or more problems may be detected in an executing application by retrieving runtime execution information from the application executing on one or more computers. The runtime information is transformed into a temporal sequence of events. A knowledgebase is searched for a dialog that has nodes in an order that match the temporal sequence of events according to a threshold degree. Responsive to finding the dialog in the knowledgebase, the dialog is launched on a user interface to interact with a user and guide the user through a problem identification and solution. Responsive to not finding the dialog, additional instrumenter is enabled in the application.

6 Claims, 11 Drawing Sheets

(51) Int. Cl.
*G06F 11/30* (2006.01)
*G06F 3/01* (2006.01)

(56) References Cited

U.S. PATENT DOCUMENTS

| | | | |
|---|---|---|---|
| 6,859,893 B2 | 2/2005 | Hines | |
| 7,039,644 B2 | 5/2006 | Hind et al. | |
| 7,386,839 B1 | 6/2008 | Golender et al. | |
| 8,051,332 B2 | 11/2011 | Zakonov et al. | |
| 2002/0087949 A1 | 7/2002 | Golender et al. | |
| 2008/0295081 A1* | 11/2008 | Albot | G06F 11/3688 717/128 |
| 2009/0183237 A1* | 7/2009 | Cortes | G06F 9/4446 726/4 |
| 2010/0161389 A1* | 6/2010 | Arning | G06N 5/04 705/7.11 |
| 2010/0318846 A1* | 12/2010 | Sailer | G06F 11/0748 714/26 |
| 2011/0016379 A1* | 1/2011 | McColl | G06F 17/246 715/219 |
| 2011/0161274 A1* | 6/2011 | Gao | G06F 17/30525 706/50 |
| 2012/0005531 A1* | 1/2012 | Manuzak | G06F 11/0709 714/25 |
| 2012/0204103 A1* | 8/2012 | Stevens | G06Q 10/10 715/273 |
| 2013/0232123 A1* | 9/2013 | Ahmed | G06F 17/30289 707/690 |
| 2013/0304897 A1* | 11/2013 | Suri | G06Q 10/043 709/224 |
| 2014/0006944 A1* | 1/2014 | Selig | G06F 9/4446 715/705 |
| 2014/0019193 A1* | 1/2014 | Eisele | G06Q 10/0639 705/7.28 |
| 2014/0026048 A1* | 1/2014 | Spirer | G06F 3/0484 715/716 |

OTHER PUBLICATIONS

ITIL Incident Management—The ITIL Open Guide, http://www.itlibrary.org/index.php?page=Incident_Management, pp. 1-4.

Andreas Hanemann, A., "Automated IT Service Fault Diagnosis Based on Event Correlation Techniques" Dissertation, Informatik und Statistik (May 2007) Munich, 343 pages.

Caldeira, J. et al., "Influential Factors on Incident Management: Lessons Learned from a Large Sample of Products in Operation" Product-Focused Software Process Improvement (Jun. 2008) pp. 330-344, vol. 5089.

Pham, R. et al., "Tailoring video recording to support efficient GUI testing and debugging" Software Quality Journal (Jun. 2014) pp. 273-292, vol. 22, No. 2.

Werlinger, R. et al., "Preparation, detection, and analysis: the diagnostic work of IT security incident response" Information Management & Computer Security (Jan. 2010) pp. 26-42, vol. 18, No. 1.

List of IBM Patents or Patent Applications Treated as Related, dated Jun. 24, 2015, 2 pages.

Office Action dated Jan. 20, 2017 received in parent U.S. Appl. No. 14/637,500, 19 pages.

* cited by examiner

PREEMPTIVE TROUBLE SHOOTING USING DIALOG MANAGER

FIELD

The present application relates generally to computers and computer applications, and more particularly to Information Technology (IT) service, incident managements, trouble shooting and code instrumentation in computer systems.

BACKGROUND

The complex failure modes for large software applications often make it very hard for system operators to effectively diagnose and rectify problems. In recent years, researchers have developed a number of powerful statistical techniques to detect problems and generate alerts in complex systems. Timely and informative alerts are definitely helpful but system operators face additional challenges when a problem is detected. For instance, the problem resolution process may involve many steps, and data relevant to diagnosing and fixing the problem must often be integrated from several sources.

The Dialog Manager offers an effective means for encoding procedural knowledge to represent resolution procedures, with the ability to guide operators perform complex procedures using a conversational interface.

BRIEF SUMMARY

A method and system of discovering problems in an application executing on a computing environment may be provided. The method may be performed by one or more processors, and may comprise retrieving runtime execution information from an application executing on one or more computers. The method may also comprise transforming the runtime information into a temporal sequence of events. The method may further comprise determining that the temporal sequence of events is associated with a proven problem by comparing the temporal sequence of events with a database of historical problems. The method may also comprise searching a knowledgebase for a dialog that has nodes in an order that match the temporal sequence of events according to a threshold degree. The method may further comprise, responsive to finding the dialog in the knowledgebase, launching the dialog on a user interface to interact with a user and guide the user through a problem identification and solution. The method may also comprise, responsive to not finding the dialog, enabling additional instrumenter in the application executing on one or more computers to retrieve additional runtime execution information.

A system of discovering problems in an application executing on a computing environment, in one aspect, may comprise a trouble shooter server running on the hardware processor, the trouble shooter server operable to retrieve runtime execution information from an application executing on one or more computers. The trouble shooter server further may be operable to transform the runtime information into a temporal sequence of events. The trouble shooter server may be further operable to determine that the temporal sequence of events is associated with a proven problem by comparing the temporal sequence of events with a database of historical problems. The trouble shooter server may be further operable to search a knowledgebase for a dialog that has nodes in an order that match the temporal sequence of events according to a threshold degree. Responsive to finding the dialog in the knowledgebase, the trouble shooter server may be further operable to direct launching of the dialog on a user interface to interact with a user and guide the user through a problem identification and solution. Responsive to not finding the dialog, the trouble shooter server may be operable to enable additional instrumenter in the application executing on one or more computers to retrieve additional runtime execution information.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
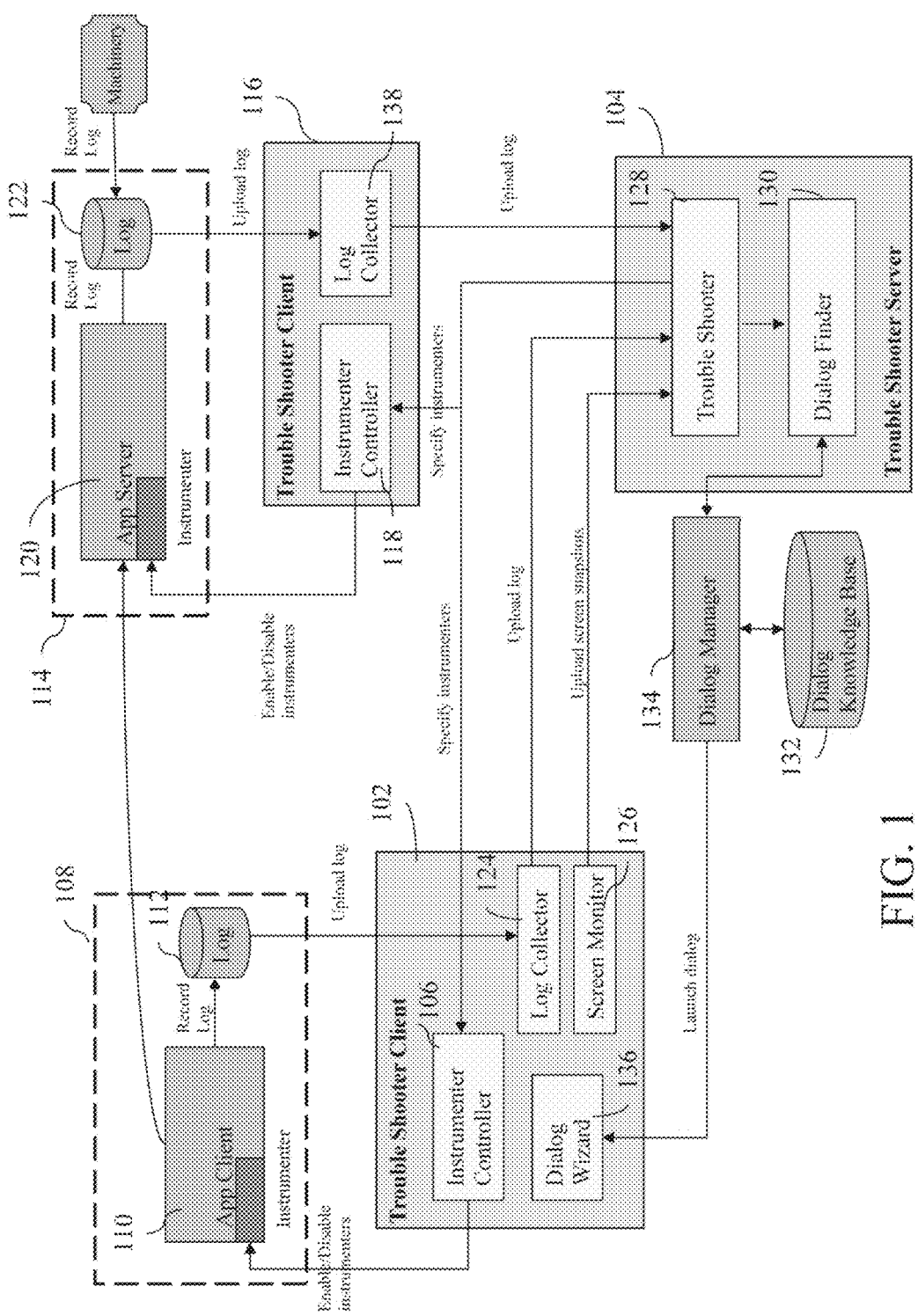
FIG. 1 is a diagram illustrating an overview of a system that preemptively trouble shoots a computing environment using a dialog manager tool or the like, in one embodiment of the present disclosure.

Incident management may include an IT service management (ITSM) process area, wherein an objective of the management may include restoring a normal service operation as quickly as possible and minimizing the impact on system operations, thus ensuring that the best possible levels of service quality and availability are maintained. In one embodiment of the present disclosure, trouble shooting may include preemptively applying the knowledge base of dialog manager to detect potential troubles (e.g., even when the user has not met the trouble or raised the ticket). Code Instrumentation in one embodiment of the present disclosure refers to an ability to monitor or measure the level of a product's performance, to diagnose errors and to write trace information. Programming may implement instrumentation in the form of code instructions that monitor specific components in a system.

Examples of log data that may be generated by an instrumenter in the present disclosure may include but are not limited to syslog and debug-level messages. Syslog for example provides computer data logging. It separates the software that generates messages from the system that stores them and the software that reports and analyzes them. Syslog can be used for computer system management and security auditing as well as generalized informational, analysis, and debugging messages. Debug-level messages are useful to developers for debugging the application.

Using tools such as a dialog manager for authoring and reusing problem resolution content can help reduce the computer system's problem ticket resolution time. A dialog manager or like tool may be a web-based tool for documenting, organizing and reusing procedural knowledge as dialogs. A dialog manager documents ticket resolution knowledge in dialogs by importing knowledge content, referred to as frequently asked questions (FAQ). Such dialog manger technique may reduce the number of tickets, reducing resolution time, lowering band mix with ticket resolution knowledge reuse.

To further enhance the utility of such tools complex environments, additional functionality may be needed: For example, automatic triggering of resolution dialogs when alerts are generated; Providing dialogs with the ability to initiate additional data collection from the monitored system, and; Directly obtaining answers to dialog questions by obtaining data directly from the monitored system.

In the present disclosure in one embodiment, a problem of preemptively applying the knowledge base of dialog manager or the like may be addressed to detect potential troubles (e.g., even when the user has not met the trouble or raised the ticket), e.g., to improve the performance of the dialog manager or the like.

In one embodiment, an approach may be disclosed that (1) Use the user metadata from various sources (e.g., app logs, screen snapshots) as inputs for a dialog manager trouble shooter, wherein the trouble shooter analyzes the various inputs to search for the most related dialog in the dialog manager knowledge base (KB) for resolution, (2) dialog manager preemptively activates a dialog when a problem occurs or has the potential to occur, and (3) dialog turns on additional instrumentation in the control system, or directly obtain answers to dialog question from the control application.

In one embodiment, runtime information may be retrieved from client and server systems to identify potential trouble, e.g., possibly even before a user becomes aware of a problem. This may be achieved, for example, using one or more of the following techniques: Monitoring logs on client and server to look for signs of problems; Scraping the screen of the client and using image analysis to detect any error or potential error conditions (screen snapshots may be retrieves as one type of log data); Dynamically activating "Instrumenters", which include pieces of code that are injected into the target application in order to log application runtime information.

In one embodiment, relevant dialog may be activated at an appropriate moment. For example, the runtime execution data (e.g., logs, screen snapshots) may be transformed into a temporal sequence of events. Each dialog may be associated with a set of temporal sequences of events. Event sequence may be monitored, e.g., continuously, to search for most relevant dialog and trigger the relevant dialog.

In one embodiment, a dialog may be launched and the usage recorded. For example, a dialog may be launched to advise the user on how to resolve the problem. The dialog usage data may be recorded to update the associations between the dialog and runtime execution information. If the collected runtime execution information is insufficient to locate the most relevant dialog, a relevant instrumenter may be activated, and additional information may be retrieved to assist the dialog search.

In one embodiment, the techniques of the present disclosure also address collecting runtime execution information effectively, for example, from a browser server (BS) and/or client-server(CS) applications that collect runtime execution information in both server side and browser/client side for further analysis; associating dialogs with various execution information to find the most relevant dialog for a problem; when the collected runtime execution information are insufficient to locate the most relevant dialog, retrieving additional information to assist the dialog search.

An instrumenter is a piece of codes that are injected into the target application aiming to log certain runtime information (e.g., the execution trace, the specific variable values, the exceptions, and others).

A dialog manager, for example, may be a web-based tool for documenting, organizing and reusing procedural knowledge as dialogs. For example, ticket resolution knowledge may be documented in dialogs by importing knowledge content, e.g., FAQ. A dialog manager may include a user interface that guides a user, for example, in problem solving, by traversing through the nodes of an appropriate dialog. A dialog knowledgebase may include a plurality of dialogs. A dialog has a plurality of nodes, each node providing a question or statement. Traversing through the nodes of a dialog may lead to an objective or a solution.

FIG. 1 is a diagram illustrating an overview of a system that preemptively trouble shoots a computing environment running an application using a dialog manager tool or the like, in one embodiment of the present disclosure. The components run on one or more hardware processors. A system in one embodiment may include a trouble shooter client component 102 (also shown at 116) and a trouble shooter server component 104. A trouble shooter client 102 may include an instrumenter controller 106 that injects (or enables or disables) instrumentation capability into an application that is being monitored for current or potential problems.

For example, an application that is being monitored for current or potential problem may include a client side 108 and a server side 114. An instrumenter controller 106 of a trouble shooter client 102, which may be deployed on the client side machine 108, may enable one or more instrumenters on application 110 on the client side 108 to cause the client application 110 to record log data associated with the application 110 (e.g., application execution runtime information) in a memory or storage device 112.

Similarly, an instrumenter controller 118 of a trouble shooter client 116, which may be deployed on the server side machine 114, may enable or disable instrumenters on the server application 120 running on the server side machine 114. Enabled instrumenters cause the server application 120 to record log data associated with the application 120 (e.g., application execution runtime information) in a memory or storage device 122.

In one embodiment, the trouble shooter clients 102 and 116 may be instances of the same trouble shooter client, for example, which are running respectively on a client side 108 and on a server side 114 machines of an application being monitored. A trouble shooter client (102, 106) may be a light weight client. In another aspect, the trouble shooter clients may run on different machines from the machines that are running the application client or server.

The trouble shooter client 102 may also include a log collector 124 that receives the log data, e.g., runtime execution information associated with the application being monitored. For example, the log collector at 124 receives the recorded log data 112 associated with the client side of the application. Similarly, a log collector at 138 receives the recorded log data 122 associated with the server side of the application.

It should be noted that while FIG. 1 shows an application that includes a client side 108 and a server side 114, and the trouble shooter clients 102, 116 deployed to collect log data from both sides, any number of trouble shooter clients may be deployed. For instance, in cases where an application that is being monitored runs as a standalone application, only one trouble shooter client may be deployed to collect log data from the standalone application. Similarly, if the application being monitored includes additional components in addition to the application client and application server, additional instances of the trouble shooter client may be deployed to collect log data or runtime execution information from the additional components. Still yet, it may be possible to deploy and run one instance of the trouble shooter to collect log data from both the server side 114 and the client side 108.

The trouble shooter client 102 may also include a screen monitor component 126 that receives screen snapshot data associated with the running application client 110. For instance, an instrumenter may store (e.g., on 112) user interface screen snapshots of the running application client 110 as part of the application execution runtime information being collected. The screen snapshots may be received by the screen monitor 126.

A trouble shooter server 104 may include a trouble shooter component 128 that receives the application runtime execution information, for example, log data and screen snapshots from one or more of the trouble shooter clients 102, 116. The application runtime execution is processed to find a dialog that is most closely related to the application runtime execution information.

For instance, the trouble shooter component 128 may identify a problem that is occurring currently or a potential future problem, for instance, based on a sequence of events identified in the application runtime execution information. A dialog finder component 130 may search a knowledge base 132, for example, one associated with a dialog manager 134, to identify or retrieve a dialog that is most closely related to the sequence of events identified as a possible problem. Once a dialog is identified, a dialog manager or like functionality may present the dialog to a user, e.g., via a dialog wizard 136. The dialog wizard 136 may include a user interface that displays or presents questions and descriptions, interacting with a user (e.g., in a conversational manner) to solve the possible problem.

The trouble shooter component 128 may also determine that not enough information is available in the received runtime execution information and in response specify one or more instrumenters to enable or inject into the application being monitored. For example, the trouble shooter component 128 may specify one or more instrumenters to a instrumenter controller (e.g., 106) to enable one or more instrumenters in the application client 110; the trouble shooter component 128 may specify one or more instrumenters to a instrumenter controller (e.g., 118) to enable one or more instrumenters in the application server 120 to obtain more information.

The functionalities of the trouble shooter client 102 and its components, and the trouble shooter server 104 and its components are described further with reference to the following figures.

Figure 2:
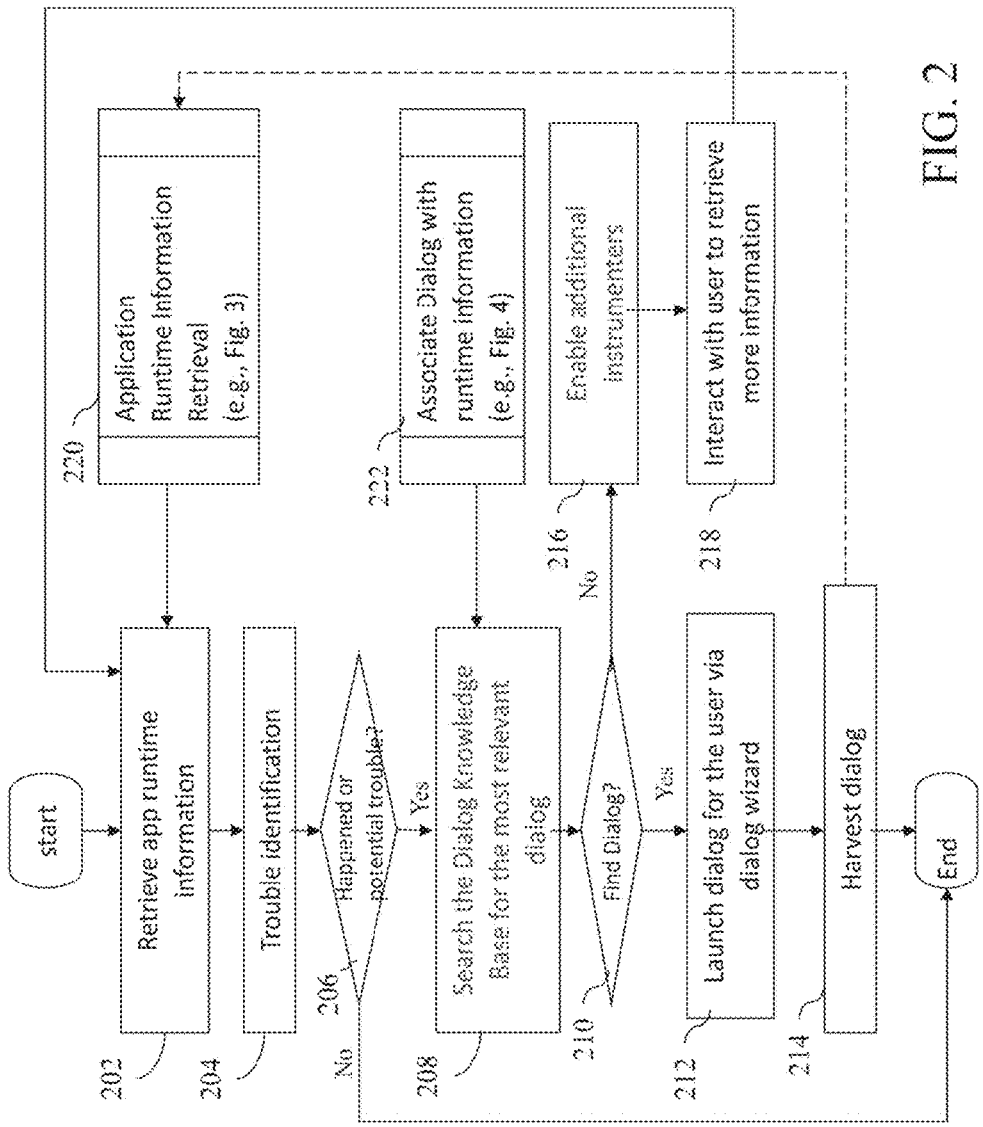
FIG. 2 is a flow diagram illustrating an overall process flow of preemptively trouble shooting a computing environment running an application using a dialog manager tool or the like, in one embodiment of the present disclosure.

FIG. 2 is a flow diagram illustrating an overall process flow of preemptively trouble shooting a computing environment running an application using a dialog manager tool or the like, in one embodiment of the present disclosure. At 202, application runtime information is retrieved, for example, runtime information of an application running or executing on a computing environment may be retrieved. In one embodiment, the runtime execution information for both the server side and client side of the application is obtained, for example, if the application has a client side and server side components. The retrieving at 202 may include an application runtime information retrieval processing at 220, further described with reference to FIG. 3.

At 204, the retrieved runtime information is analyzed to identify possible current or potential trouble or problem in the running application. For example, a trouble shooter component of a trouble shooter server shown in FIG. 1 at 104 may identify a current or potential problem. This processing may be achieved by comparing the runtime information with historical data, e.g., previous runtime information or log data that are known to be associated with or related to a proven problem. Further detail of trouble identification is described with reference to FIG. 5.

Referring to FIG. 2, at 206, it is determined whether the retrieved runtime information indicates that there is a current problem or a potential problem that could occur in the executing application in a computing environment. If so, the processing logic proceeds to 208; otherwise, the logic returns, e.g., to continue to monitor for more runtime execution information for trouble identification.

At 208, a knowledgebase is searched for a dialog (e.g., the most relevant dialog) that matches a sequence of events in the retrieved runtime information that is determined to cause a problem or potential problem. Whether a dialog matches the sequence of events may be based on a matching algorithm that finds dialogs that may be related to the sequence of events to a degree, e.g., a threshold degree. For example, the searching at 208 may utilize dialog node association knowledgebase, for example, built at 222, which is further described with reference to FIG. 4. An example of searching 208 is further described with reference to FIG. 8.

At 210, it is determined whether a relevant dialog is found in the dialog knowledgebase. If so, at 212, a dialog may be launched via a dialog wizard. A dialog wizard is a tool that may include user interface functionalities that present a dialog to a user, browsing or "walking" through the nodes of the dialog, presenting questions and answers and/or statements to identify a problem and/or solution.

At 214, the launched dialog is harvested. For example, dialog nodes traversed during the user interaction via the user interface may be logged or stored. For example, during the dialog usage, if any additional information which can be used to enrich the existing dialog or to generate a new dialog is encountered or discovered, the information may be extracted to enrich an existing dialog or to generate a new dialog.

If at 210, no dialog that matches or is related to the sequence of events in the retrieved runtime information is found, additional instrumenters may be enabled at 216. At 218, the automated logic of the present disclosure interacts with a user, e.g., via a user interface, to retrieve more information. For example, a pop-up dialog UI may be presented asking the user to provide more input about information. For example, if there is no intrumenter that can collect version information of an application the user is using, pop-up a dialog UI may be presented asking the user to input the application version the user is using. The information, e.g., the application version the user inputs can be collected for further trouble shooting.

Figure 3:
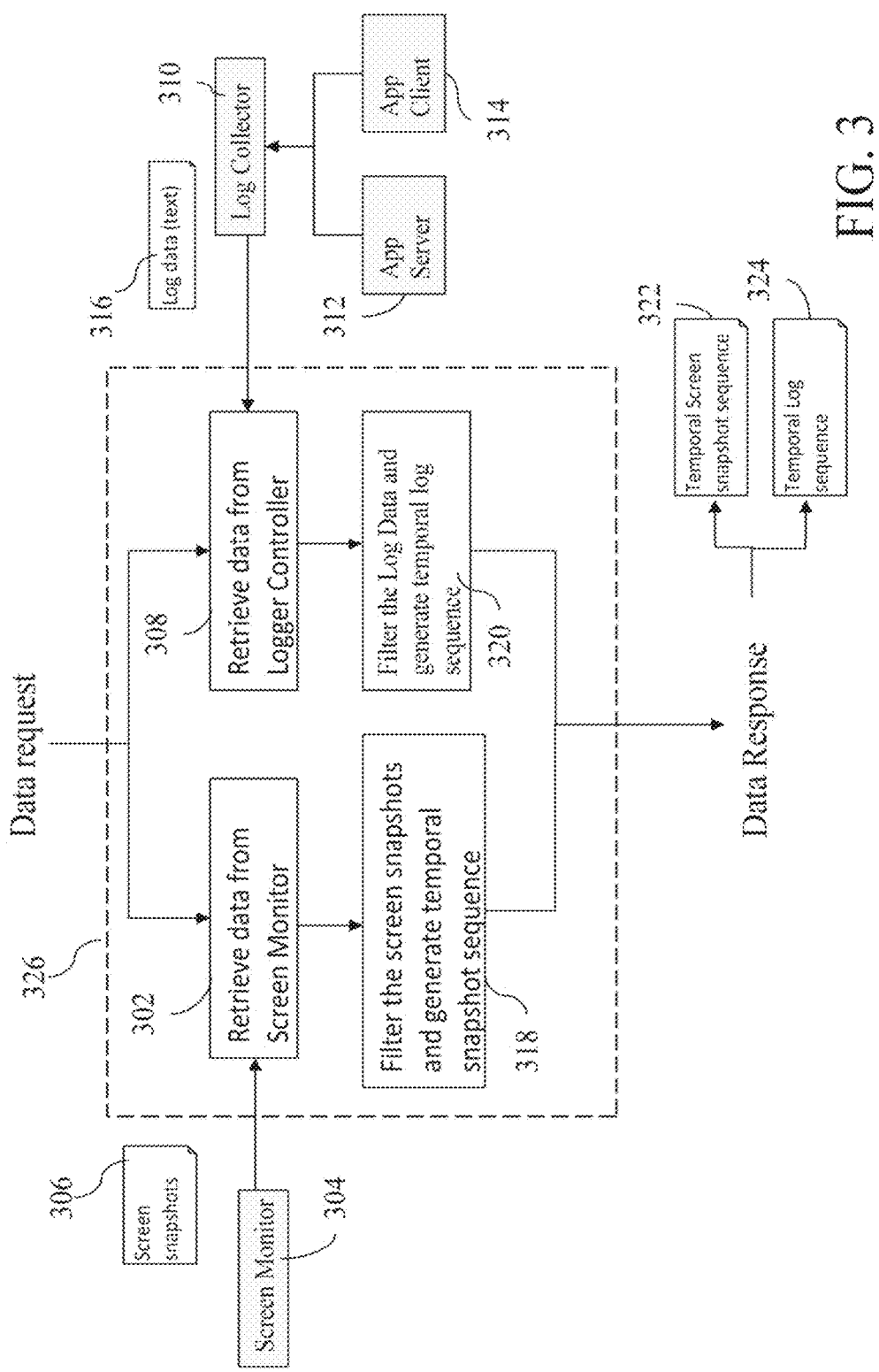
FIG. 3 is a diagram illustrating a process flow that retrieves application runtime execution information in one embodiment of the present disclosure.

FIG. 3 is a diagram illustrating a process flow that retrieves application runtime execution information in one embodiment of the present disclosure. For example, a trouble shooter component (shown in FIG. 1 at 128) of a trouble shooter server (shown in FIG. 1 at 104) may perform the processing shown at 326. For instance, a trouble shooter component (FIG. 1 at 128) may request runtime execution information from a trouble shooter client (shown in FIG. 1 at 102). At 302, data may be retrieved or received from a screen monitor 304 (e.g., a screen monitor component of a trouble shooter client shown at 126 in FIG. 1). A screen monitor functionality 304 may receive screen snapshots 306 taken and stored in an executing application (e.g., application client shown at 110 in FIG. 1). At 318, the screen snapshots 306 may be filtered and a temporal snapshot sequence is generated based on the screen snapshots, e.g., based on the filtered screen snapshots.

At 308, data may be retrieved or received from a logger controller. For example, log collector functionality 310 (e.g., shown in FIG. 1 at 124 and 138) may obtain runtime log data 316 from an executing application, e.g., application server 312 and an application client 314. The log data 316 is transmitted, e.g., via an electronic communication, to a trouble shooter server, e.g., a trouble shooter component shown at 128 in FIG. 1. At 320, the obtained log data 316 may be filtered and a temporal log sequence is generated. The processing shown at 326 generates temporal screen snapshot sequence 322 and temporal log sequence 324.

Figure 4:
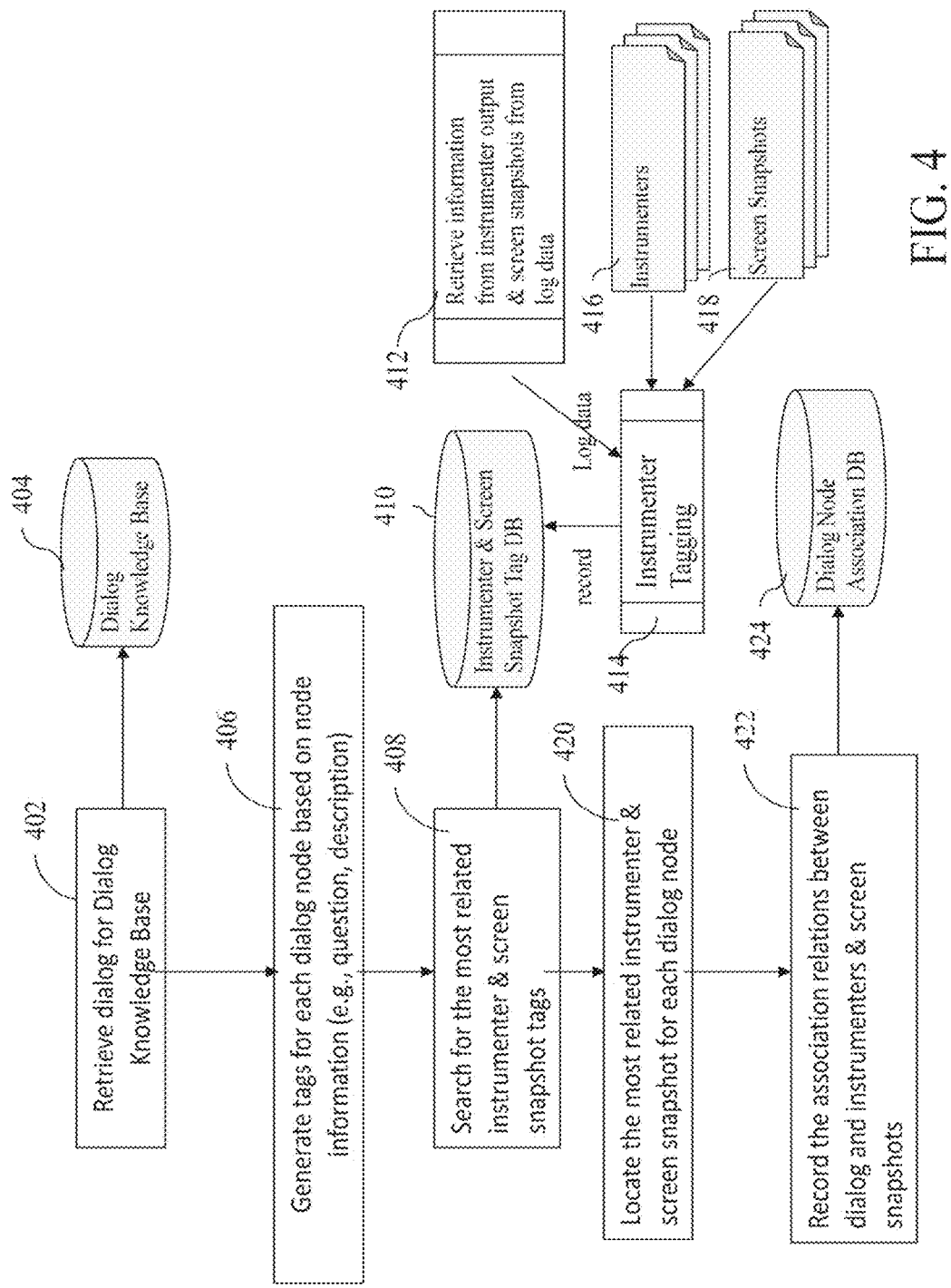
FIG. 4 is a diagram illustrating a process flow that associates dialogs with instrumenters that produce log data and associates dialogs with snapshots in one embodiment of the present disclosure.

FIG. 4 is a diagram illustrating a process flow that associates dialogs with instrumenters that produce log data and associates dialogs with snapshots in one embodiment of the present disclosure. For example, existing dialogs in a knowledgebase and the nodes of the dialogs are associated with instrumenter and/or screen snapshot in one embodiment of the present disclosure. At 402, a dialogs is retrieved, e.g., from a dialog knowledgebase 404 (e.g., generated and used by a dialog manager).

At 406, a tag may be generated for each dialog node based on node information, e.g., whether the dialog is a question, a description, or another.

At 408, an instrumenter and screen snapshot tag database 410 may be searched to identify instrumenter and screen snapshot tags that are related to the retrieved dialog. For example, dialog tags may be compared with the instrumenter and screen snapshot tags to find a match. This matching may be based on keyword matching between the dialog tags (or content of the dialog) and the instrumenter and screen snapshot tags.

A tag in one embodiment may be a static word that marks the instrumenter or snapshot. An example of an instrumenter tag may include "get user confidential". An example of a snapshot tag may include "Log in page".

An instrumenter 416 collects runtime data and outputs such data to a log file. A screen snapshot 418 may be collected by a special instrumenter that collects screen snapshots. A screen snapshot records the user interfaces displayed to the user. There may be a plurality of instrumenters 416 and screen snapshots 418. At 412 more information may be provided from extracting the log data, for example, instrumenter output and screen snapshots. Instrumenter tagging at 414 tags instrumenters and screen snapshots, for example, with descriptive information. For example, instrumenter tagging at 414 extracts keywords as tags from log files, and then associates these tags with intrumenters and snapshots. An instrumenter, e.g., is a piece of code, and each instrumenter has a unique identifier or name. The unique identifier or name may be tagged with a tag. An example of a tag is a keyword or a phase. The results from instrument tagging and screen snapshot tagging are stored in an instrument and screen snapshot tag database 410.

The instrument and screen snapshot tag database 410, e.g., may be built as follows in one embodiment. At 412, information is retrieved from instrumenter output and screen snapshots. The instrumenter output and screen snapshots may be made available via log data. At 414, instrumenter tagging may include tagging instrumenters 416 and screen snapshots 418 with the information associated with those instrumenters and screen snapshots, for example, based on keywords extracted from the information at 412.

At 420, the most related instrumenter and screen snapshot is located for each dialog node of the dialog identified at 408. For example, the instrumenter and screen snapshot tags identified at 408 are assigned to the dialog nodes of the dialog identified at 408. So for example, a dialog node may be associated with an instrumenter tag and/or a screen snapshot tag. A dialog node that is relevant to the identified instrumenter and screen snapshot tags may be determined, e.g., based on keyword matching between the dialog node's tag (and/or its content) and the identified instrumenter and/or screen snapshot tags (and/or their content).

At 422, association relations between dialog and instrumenters and screen snapshots are recorded, for example, stored in a dialog node association database 424. The knowledgebase referred to in FIG. 2 at 208 to search for a dialog may comprise this dialog node association database 424. For example, the knowledgebase is generated by retrieving an existing dialog from a dialog knowledgebase. For each node in the dialog, a node may be tagged with one or more of an associated instrumenter or screen snapshot, based on topic matching between content of the node and one or more of content of the instrumenter's output or screen snapshot. Associations between the nodes of the existing dialog and one or more of instrumenters and screen snapshots are stored. The one or more of content of the instrumenter's output or screen snapshot may be transformed to tags and stored as instrumenter and screen snapshot tag database 410, and the topic matching may be performed between the content of the node and the instrumenter and screen snapshot tag database 410.

Figure 5:
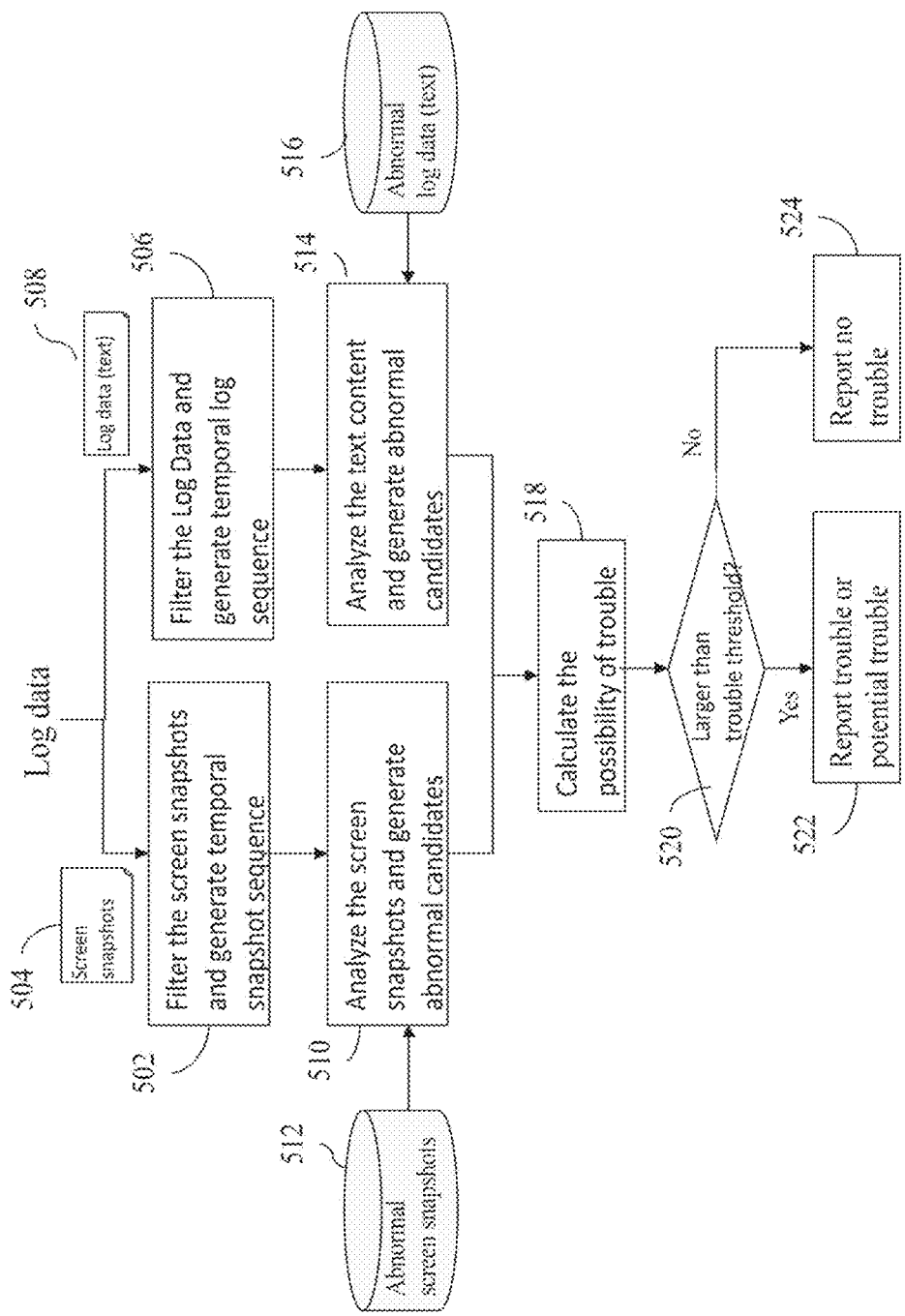
FIG. 5 is a diagram illustrating a process flow that identifies a problem or trouble in an application running in a computing environment in one embodiment of the present disclosure.

FIG. 5 is a diagram illustrating a process flow that identifies a problem or trouble in an application running in a computing environment in one embodiment of the present disclosure. A trouble shooter component of a trouble shooter server shown in FIG. 1 at 104 may perform this processing. This processing, for instance, may be performed as part of the processing at 204 shown in FIG. 2. The runtime information may be transformed into a temporal sequence of events. For instance, at 502, screen snapshots 504 may be filtered and temporal snapshot sequence is generated. Also, at 506, log data may 508 be filtered and a temporal log sequence is generated. The screen snapshots 504 and the log data 508 are obtained from runtime execution of the application. The processing at 502 and 506 are the same processing shown in FIG. 3 at 318 and 320. Thus, for example, if the generating of the temporal snapshot sequence and the temporal log sequence is already performed as part of the runtime execution information retrieval, the trouble identification processing need not repeat the processing of 502 and 508. At 510, the screen snapshots in the temporal snapshot sequence are analyzed and abnormal candidates are generated, e.g., based on a database of abnormal screen snapshots 512. The database of abnormal screen snapshots 512, for example, stores screen shots that are historically related to a problem. At 514, the text content in the temporal log sequence is analyzed and abnormal candidates are generated, e.g., based on a database of abnormal log data 516. Abnormal log data 516, for example, stores log data that are historically related to a problem.

At 518, based on the abnormal candidates, a value is calculated that may quantify whether there is a problem or a possibility of a problem. Whether the temporal sequence is abnormal may be determined using the following methodology in one embodiment of the present disclosure. A pre-processing step, for example, may include retrieving all known temporal sequences that lead to problems, and merging them into a tree structure, e.g., namely, temporal sequence tree. The purpose of the temporal sequence tree in one embodiment is to speed up the matching procedure. At runtime, the temporal sequence of the ongoing usage is compared with the temporal sequence tree. If there is any matching temporal sequence in the temporal sequence tree, then it is determined that a problem or a possibility of a problem may exist. A value may be calculated based on the degree of matching.

At 520, it is determined whether the value calculated at 518 is larger than a defined trouble threshold. If the value is larger, then at 522, the detected problem or potential problem may be reported, e.g., as an alert with the description of the problem. If the value is not larger than the defined trouble threshold, the problem is not reported as shown at 524.

Figure 6:
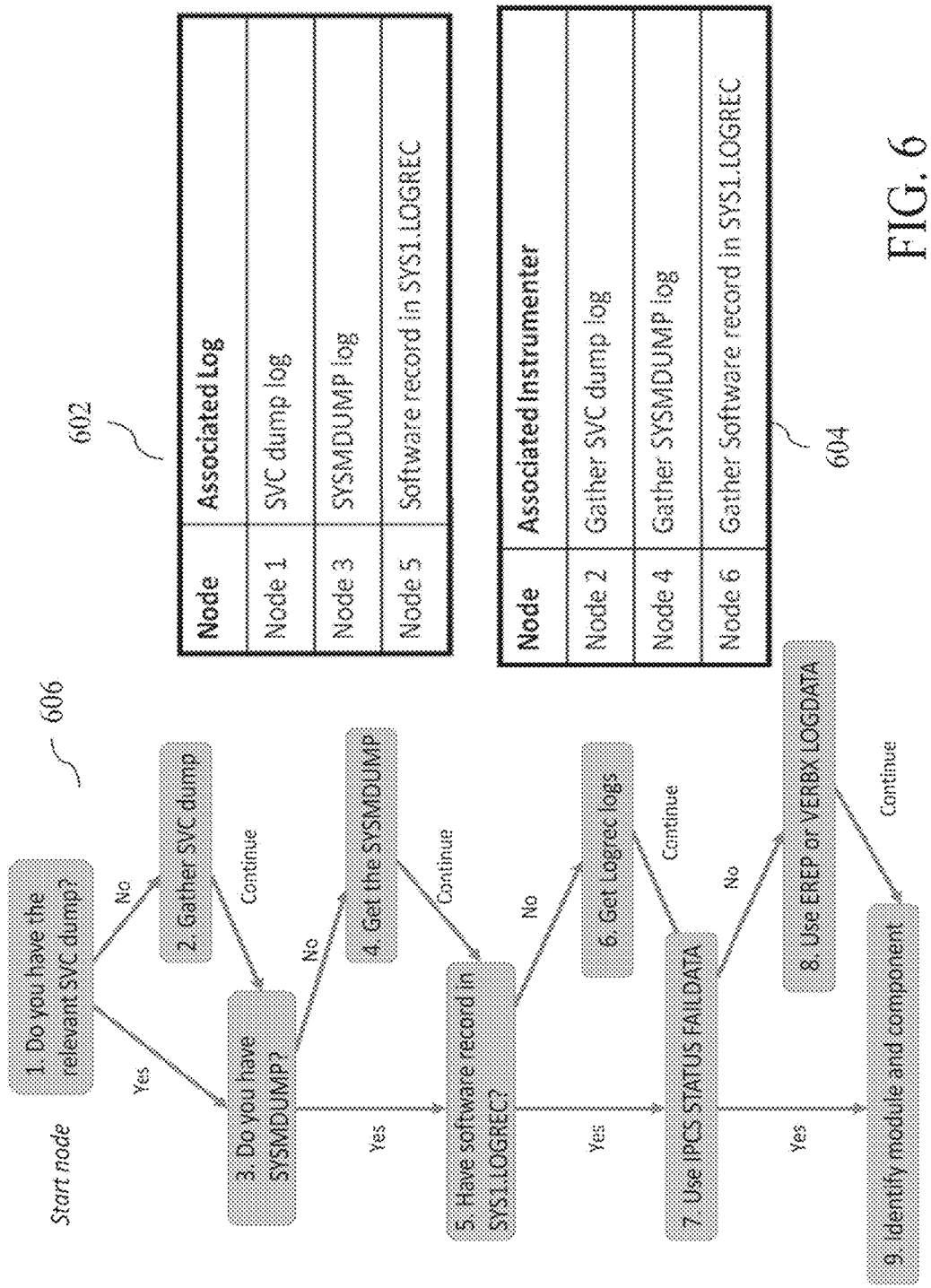
FIG. 6 is a diagram illustrating an example of handling abnormal ends in one embodiment of the present disclosure.

FIG. 6 is a diagram illustrating an example dialog that handles abnormal ends in one embodiment of the present disclosure. The dialog 606 shown in this figure guides the diagnosis of an abnormal end (ABEND). ABENDs have an associated system completion code to describe the error and most have a reason code to further explain the error. This dialog may be tagged, for example, its nodes tagged with a log and/or instrumenter tag.

The table at 602 shows a list of association of a dialog node to a log data. The matching may be performed by keyword matching between log description and instrumenter/snapshot tags. The instrumenter/snapshots are associated with the dialog node (also based on the matching between tags and node descriptions). For example, log data is collected and the log data is transformed into instrumenter/snapshots, which are then mapped with the dialog nodes.

The table at 604 shows a list of association of a dialog node to an instrumenter. This table shows a sample association that may be generated in FIG. 4 at 420. FIG. 6 shows how log data is matched with the dialog nodes via the bridge of associated intrumenter of the dialog node.

Figure 7:
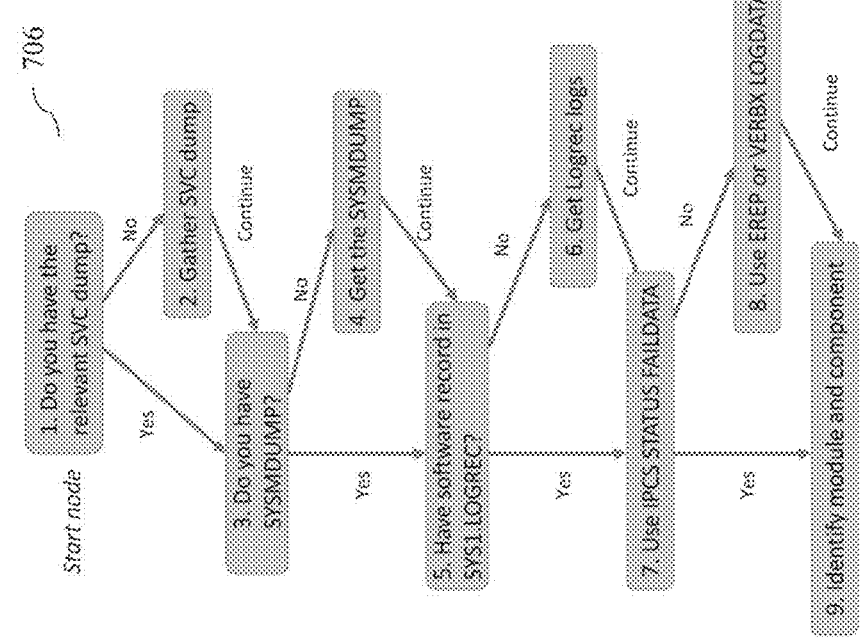
FIG. 7 is a diagram illustrating an example of a set of temporal sequence templates of a dialog in one embodiment of the present disclosure.

FIG. 7 is a diagram illustrating an example of a set of temporal sequence templates of a dialog in one embodiment of the present disclosure. The table at 704 shows a temporal sequence generated from log data of runtime execution information. The table at 702 shows a list of association of log to a dialog node in a dialog 706. This list shows that a dialog node 1 is tagged with log data "SVC dump log", dialog node 3 is tagged with "SYSMDUMP log", dialog node 5 is tagged with "Software record in SYS1.LOGREC". The elements in the temporal sequence 704 may be compared with the association of the nodes and logs 702, e.g., the tagged nodes. In this example, the elements (type 1, 2 and 3) of the temporal sequence 704 match the tags of nodes 1, 3 and 5 of the dialog shown at 706.

Figure 8:
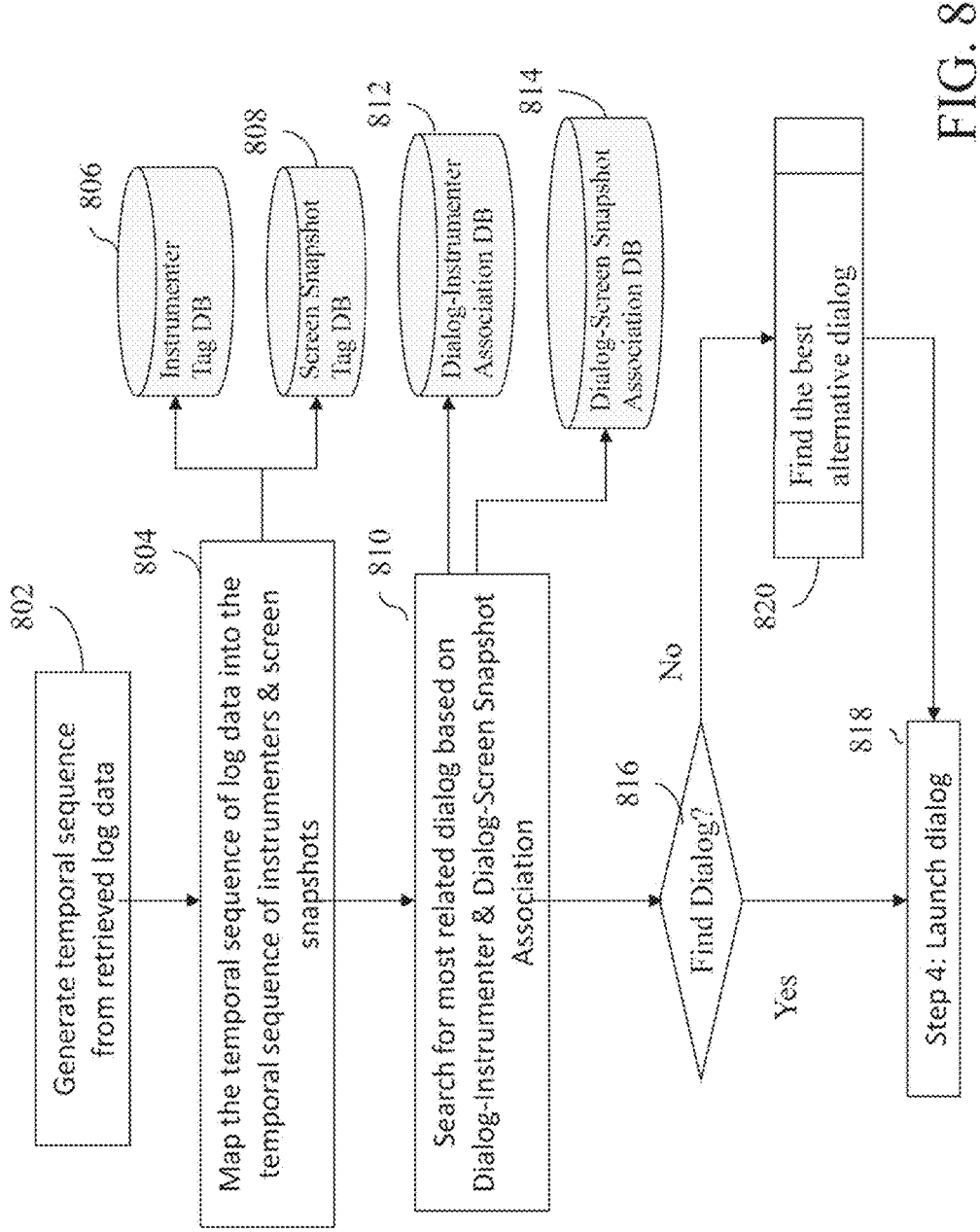
FIG. 8 is a diagram illustrating a process flow that searches for a dialog in one embodiment of the present disclosure.

FIG. 8 is a diagram illustrating a process flow that searches for a dialog in one embodiment of the present disclosure. For instance, in one embodiment, the processing shown in FIG. 2 at 208, 210, and 212 may include the processing shown in FIG. 8. At 802, temporal sequence may be generated from retrieved log data. For example, events in the retrieved log data and screen snapshot data may be ordered into a sequence of events according to their time of occurrence. At 804, the temporal sequence of log data is mapped into the temporal sequence of instrumenters and screen snapshots. For instance, an instrumenter tag database 806 and screen snapshot tag database 808 may be used for this mapping. The matching may be performed by keyword matching between log description and instrumenter tags/ screen snapshot tags. In one embodiment, the temporal sequence of log data is transformed into the temporal sequence of instrumenter/screen snapshots. The instrumenter tag database 806, for example, stores the instrumenter tags and their associations to the instrumenters. For example, an instrumenter's unique identifier or name may be tagged with a keyword or a phrase. The screen snapshot tag database 808, for example, stores the screen snapshot tags and their associations to screen snapshots. The instrumenter tag database 806 and the screen snapshot tag database 808 may be generated according to a processing described with reference to FIG. 4, e.g., at 410.

At 810, a dialog-instrumenter database 812 and dialog-screen snapshot association database 814 may be searched for a dialog that for example mostly matches the temporal sequence of instrumenters and screen snapshots mapped at 804. For instance, a dialog-instrumenter database 812 stores dialogs and corresponding nodes tagged with associated instrumenter tags. Similarly, a dialog-screen snapshot association database 814 stores dialogs and corresponding nodes tagged with associated screen snapshot tags. Searching may be performed by comparing (e.g., finding matching keywords) the tags of dialog nodes with keywords of the temporal sequence.

At 816, it is determined whether a dialog is found. If so, at 818, the dialog is launched. Otherwise, at 820, an alternative dialog that best matches may be provided. For instance, dialogs that match may be order by a degree of matches, and the one with the highest degree of match may be provided.

Figure 9:
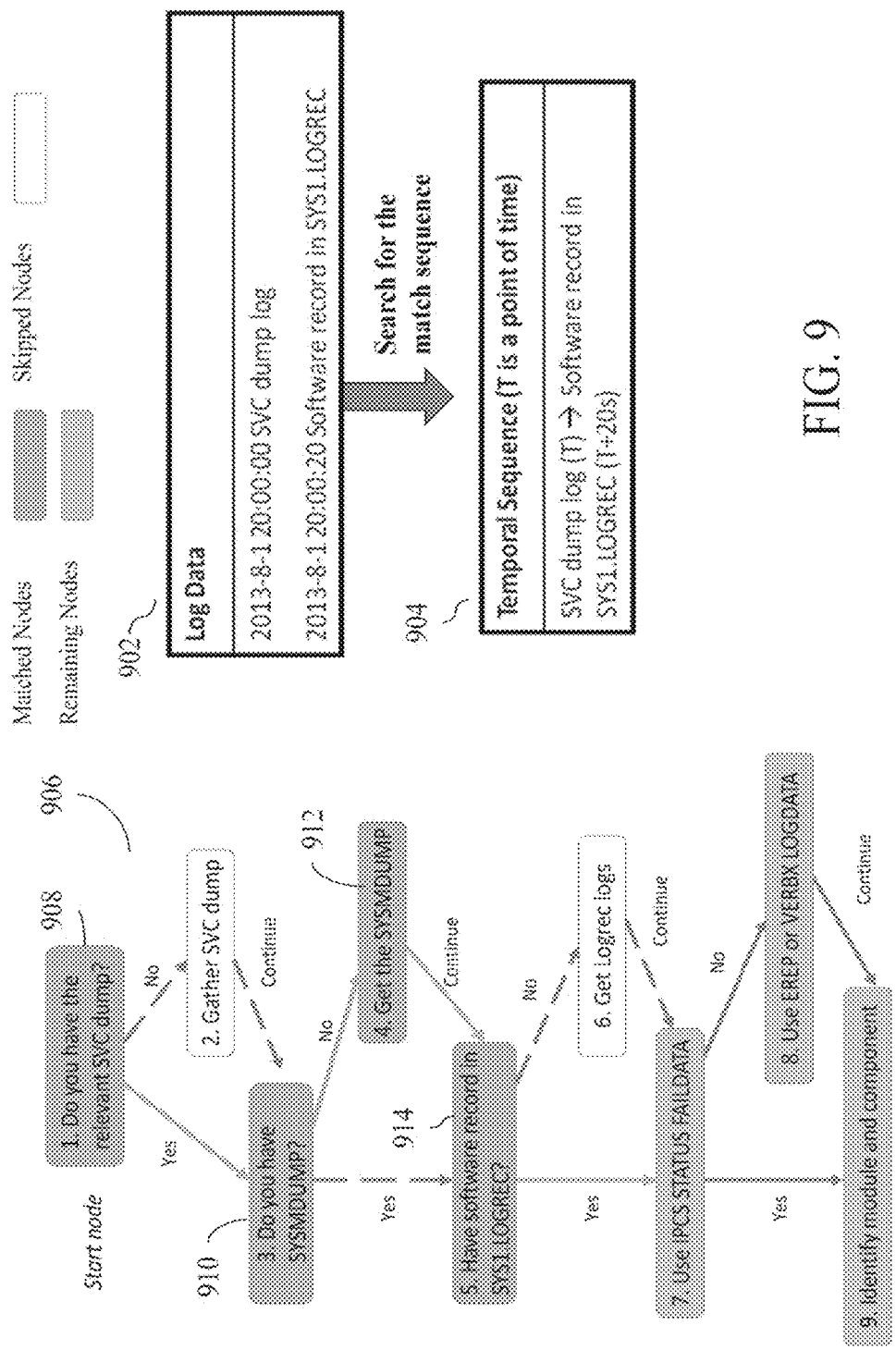
FIG. 9 is a diagram illustrating an example of searching for a dialog in one embodiment of the present disclosure.

FIG. 9 is a diagram illustrating an example of searching for a dialog in one embodiment of the present disclosure. This example, for simplicity, only illustrates instrumenter information for searching for a dialog. For instance, log data 902 is generated into a temporal sequence 904. The dialog at 906, specifically the dialog nodes 908, 910, 912 and 914 match the temporal sequence 904, for example, based on keyword matching and time order. For instance, the temporal sequence includes SVC dump log followed by SYS1.LOGREC at 904. The dialog at 908 includes node 1 908, node 3 and node 4 all of which refer to SVC dump, and all of which are followed by node 5 that refers to SYS1.LOGREC. Therefore, this dialog 908 includes 4 matched nodes. This type of searching may be performed for all dialogs in the dialog database. Based on the degree of matching, for example, the number of matching nodes by temporal sequence, the most or best related dialog may be obtained. Instrumenter tags are used when matching log data description and intrumenters. The matching between intrumenter and dialog node in one embodiment is described with reference to FIG. 4, which also uses instrumenter tags and dialog node descriptions.

The techniques of the present disclosure, e.g., as described above, preemptively recommend a relevant problem resolution (dialog) to a problem that may have occurred or have a potential to occur, for example, during an execution of an application in a computing environment. This may be accomplished, e.g., by retrieving runtime execution information from an application, e.g., from a server side and client side of the application (e.g., if applicable), and identifying potential troubles from the runtime execution information. For example, logs may be monitored on client and server running the application to look for signs of problems; screen of the client application may be scraped and image analysis may be performed to detect any error or potential error conditions; "Instrumenters", which are pieces of code that are injected into the target application in order to log application runtime information, may be dynamically activated and/or deactivated. The number of instrumenters can be dynamically adjusted (enable or disable), based on the latest dialogs (which can change from time to time) in the knowledge base. Dynamic instrumenters may collect the runtime execution data (e.g., logs, screen snapshots), which are transformed into a temporal sequence of events. The techniques for monitoring runtime and retrieving runtime execution information in one embodiment only has small effect on the system that is being monitored to minimize any system performance overhead that might be caused by the monitoring. At a designated point in time, relevant dialog may be activated. For instance, the runtime execution data (logs, screen snapshots) may be transformed into a temporal sequence of events. In one aspect, keywords or topics may be extracted from the text content of the runtime execution data to transform the information into a temporal sequence of events. Each dialog may be associated with a set of temporal sequences of events. Event sequence may be continuously monitored to search for most relevant dialog (dialog path) and to trigger the relevant dialog.

An identified dialog may be launched and new dialog may be harvested. For example, the relevant dialog identified based on the runtime execution information may be launched. The launched dialog advises the user to interact with the dialog to solve a problem. The dialog usage data may be recorded to update the associations between dialog and runtime execution information. If the collected runtime execution information is insufficient to locate the most relevant dialog, one or more instrumenter(s) may be activated for more runtime execution information. The additional information so obtained assists the dialog search.

Figure 10:
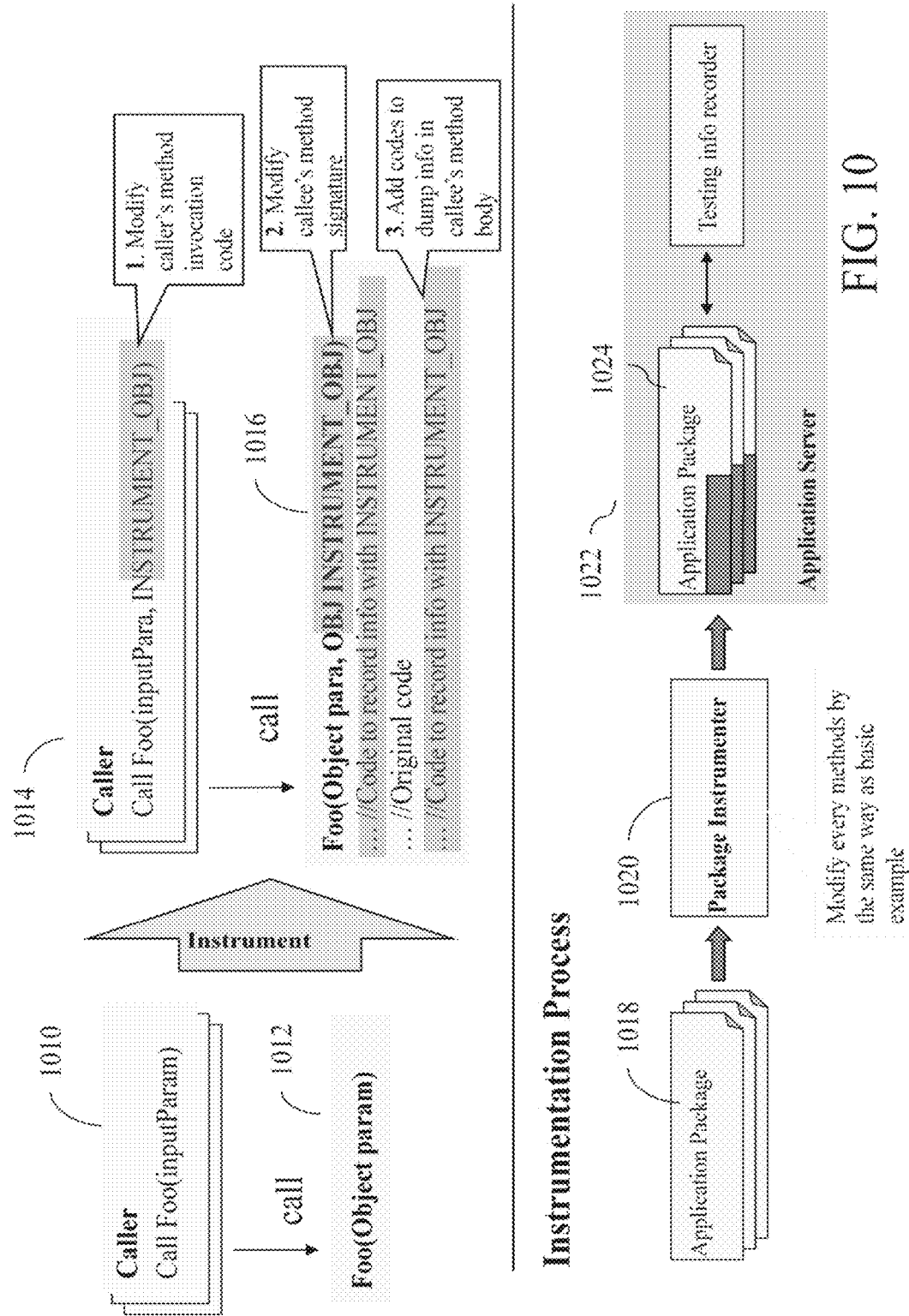
FIG. 10 shows an example of program instrumentation in one embodiment of the present disclosure.

FIG. 10 shows an example of program instrumentation in one embodiment of the present disclosure. As a basic example, a method call of an example method Foo from a caller program or module is shown at 1010 with one parameter. A call to the method invokes the method with one parameter at 1012. Instrumenting the call may modify the caller's method invocation code, e.g., as shown at 1014 to include an additional parameter. Shown at 1016, called method's signature and the body of the code are also modified. For example, the code may be added for dumping information (logging information). Instrumentation process in an application package level may include package instrumenter 1020, which may modify the methods in the application package 1018 to log information, similarly to the basic example. An application 1022 (e.g., application server) may include application methods that have the instrumentation code injected in them as shown at 1024.

Figure 11:
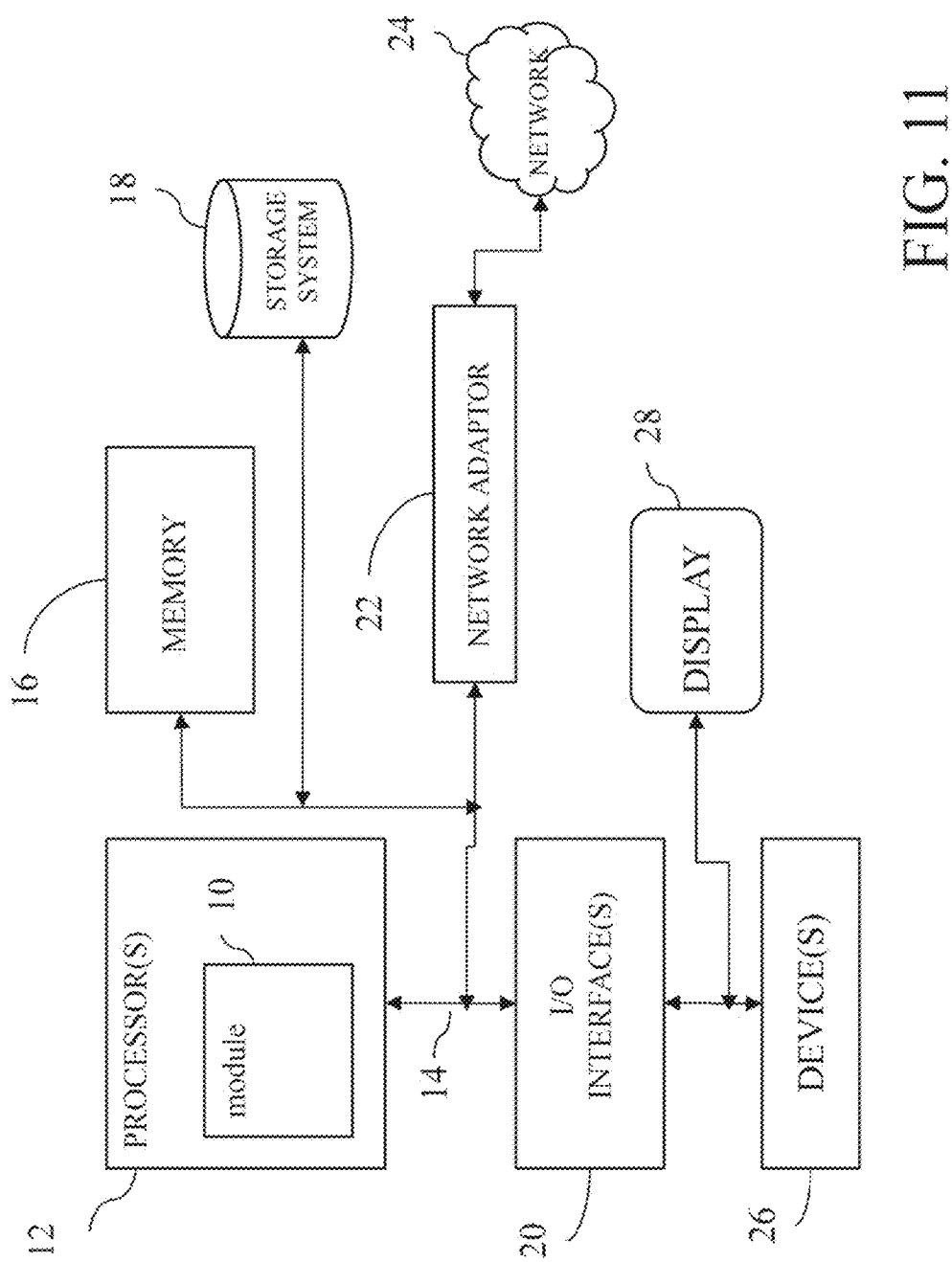
FIG. 11 illustrates a schematic of an example computer or processing system that may implement a system that may preemptively recommend a problem resolution in a computing environment in one embodiment of the present disclosure.

FIG. 11 illustrates a schematic of an example computer or processing system that may implement a system that may preemptively recommend a problem resolution in a computing environment in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein, for example, functionalities of a trouble shooter server or a trouble shooter client, or both. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of discovering problems in an application executing on a computing environment, the method performed by one or more processors, comprising:
    retrieving runtime execution information from an application executing on one or more computers;
    transforming the runtime information into a temporal sequence of events;
    determining that the temporal sequence of events is associated with a proven problem by comparing the temporal sequence of events with a database of historical problems;
    searching a knowledgebase for a dialog that has nodes in an order that match the temporal sequence of events according to a threshold degree;
    responsive to finding the dialog in the knowledgebase, launching the dialog on a user interface to interact with a user and guide the user through a problem identification and solution; and
    responsive to not finding the dialog, enabling additional instrumenter in the application executing on one or more computers to retrieve additional runtime execution information, wherein the searching a knowledgebase for dialog comprises:
    mapping the temporal sequence of events into a temporal sequence of instrumenters and screen snapshots; and
    searching a dialog to instrumenter association database and a dialog to screen snapshot association database for a dialog that is associated with the temporal sequence of instrumenters and screen snapshots, wherein the knowledgebase comprises the dialog to instrumenter association database and the dialog to screen snapshot association database.

2. The method of claim 1, further comprising harvesting the dialog by logging dialog nodes traversed during the user interaction via the user interface.

3. The method of claim 1, wherein the retrieving runtime execution information comprises retrieving screen snapshots associated with the application and retrieving output data generated by one or more instrumenters injected into the application.

4. The method of claim 1, wherein the application comprises an application client running on a client machine and an application server running on a server machine.

5. A method of discovering problems in an application executing on a computing environment, the method performed by one or more processors, comprising:
    retrieving runtime execution information from an application executing on one or more computers;
    transforming the runtime information into a temporal sequence of events;
    determining that the temporal sequence of events is associated with a proven problem by comparing the temporal sequence of events with a database of historical problems;
    searching a knowledgebase for a dialog that has nodes in an order that match the temporal sequence of events according to a threshold degree;
    responsive to finding the dialog in the knowledgebase, launching the dialog on a user interface to interact with a user and guide the user through a problem identification and solution; and
    responsive to not finding the dialog, enabling additional instrumenter in the application executing on one or more computers to retrieve additional runtime execution information, wherein the knowledgebase is generated by:
    retrieving an existing dialog from a dialog knowledgebase;
    for each node in the dialog, tagging the node with one or more of an associated instrumenter or screen snapshot, based on topic matching between content of the node and one or more of content of the instrumenter's output or screen snapshot; and storing associations between the nodes of the existing dialog and one or more of instrumenters and screen snapshots.

6. The method claim 5, wherein the one or more of content of the instrumenter's output or screen snapshot are transformed to tags and stored as instrumenter and screen snapshot tag database, wherein the topic matching is performed between the content of the node and the instrumenter and screen snapshot tag database.

* * * * *